Figure 1:
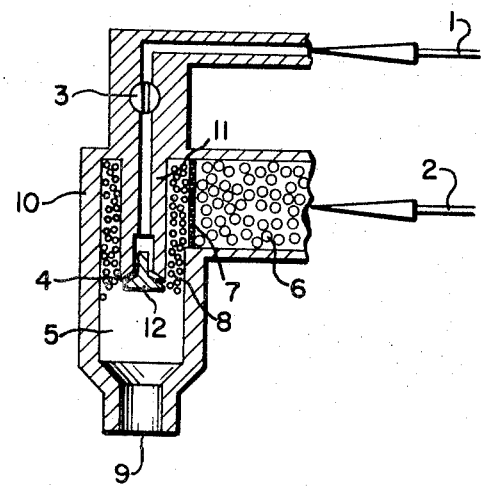

March 25, 1969      K. BAR      3,434,805
APPARATUS FOR CONTINUOUSLY PRODUCING A PLASTIC FOAM
Filed Aug. 22, 1966

INVENTOR.
KARL BAR
BY Kurt Kelman
AGENT

United States Patent Office 3,434,805
Patented Mar. 25, 1969

3,434,805
APPARATUS FOR CONTINUOUSLY PRODUCING A PLASTIC FOAM
Karl Bar, Buchen, Odenwald, Germany, assignor to Schaum Chemie, Wilhelm Bauer K.-G., Essen, Germany
Filed Aug. 22, 1966, Ser. No. 574,126
Int. Cl. B01j
U.S. Cl. 23—285                5 Claims The present invention relates to the manufacture of plastic foams from a curable liquid synthetic resin and a foaming agent foam containing a curing accelerator for the synthetic resin, and more particularly to improvements in an apparatus for continuously producing such plastic foams.

It is conventional to produce such foams by first making a foaming mixture of a foaming agent solution and a gas, such as air, and then mixing this foam with a liquid synthetic resin, such as precondensate of urea and formaldehyde. Such a precondensate of a thermosetting resin is then cured by means of a curing accelerator for the resin, such as oxalic acid or another acid, which is contained in the foaming agent foam. In known apparatus for producing plastic foams from these components, it is known to use a mixing chamber to which an inlet conduit delivers the foaming agent foam and a nozzle delivers the liquid synthetic resin into the chamber close to the outlet thereof. Thus, the mixture components delivered to the chamber under pressure are continuously mixed and a plastic foam may be continuously removed through the outlet from the chamber.

It is a primary object of the present invention to provide an apparatus of the above type, wherein the mixture components are delivered in a predetermined ratio and are intimately and homogeneously mixed in a mixing compartment, thus to avoid partial or complete collapse of the produced plastic foam due to any unevenness in the mixture.

It is another object of this invention to provide an improved apparatus of this type, which particularly avoids the above difficulties arising at the beginning and/or end of each mixing operation.

When an apparatus of this type is used in situ, for instance at a construction site, to fill cavities with plastic foam, to produce plastic foam layers for purposes of heat and/or sound insulation, and the like, difficulties arise particularly when the apparatus is put to use for a new mixing operation while some of the components still remain in the mixing chamber from the last operation. With frequent interruptions of the mixing operation, this becomes a considerable problem which is overcome by a preferred embodiment of the invention.

In one aspect of the invention, designed to assure thorough and uniform mixing of the components, the nozzle which delivers the liquid synthetic resin to a mixing compartment adjacent the outlet of the chamber, defines an annular outlet slot radially extending from the axis of the chamber and inclined toward the chamber outlet. Thus, the housing of the apparatus defines a mixing compartment between the nozzle and the outlet, while the inlet conduit for delivering the foaming agent foam containing the accelerator passes through the housing into the chamber above the nozzle.

In the preferred embodiment of the invention, at least one air supply conduit is provided, which has an outlet either in the annular slot of the nozzle or in the liquid resin delivering conduit whereby an air blast may be delivered into the mixing chamber after the supply of the mixture component has been shut off, for cleaning the mixing compartment and removing all material therefrom.

Figure 2:
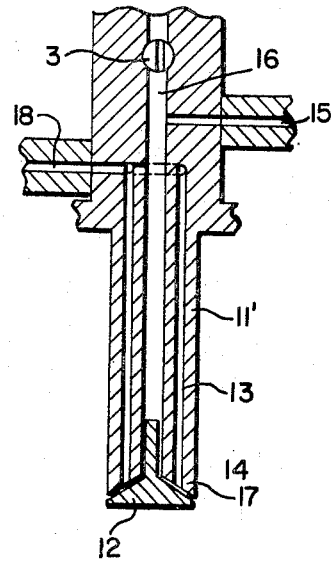

The above and other objects, advantages and features of the present invention will become more apparent in the following detailed description of preferred embodiments thereof, taken in conjunction with the accompanying drawing wherein:

FIG. 1 is a longitudinal section of an apparatus according to the invention; and FIG. 2 is a similar section showing one specific embodiment of the conduit for delivering the curable liquid synthetic resin to the elongated chamber of the apparatus.

Referring now to the drawing and first to FIG. 1, there is shown a tubular housing 10 defining an elongated chamber. The housing has an outlet in the longitudinal axis of the chamber and the outlet 9 is in communication with the chamber. The conduit 1 for delivering the curable liquid synthetic resin to the elongated chamber passes through the housing into the chamber and has an inner end in the chamber adjacent the outlet 9. A metering valve 3 is mounted in this conduit to enable the liquid synthetic resin to be delivered into the chamber in a predetermined ratio in relation to the foaming agent foam. Under conventional operating conditions, the synthetic resin may be delivered under a pressure of about four to five atmospheres.

The inlet conduit 2 for delvering the foaming agent foam containing the accelerator also passes through the housing and delivers the foam into the chamber, a valve (not shown) being mounted in this conduit, too, to regulate the foam delivery. A filter 7 is mounted in this conduit at the entry to the chamber so that the foam 6 of relatively large bubbles is broken up and enters the chamber in the form of relatively small bubbles.

As shown in FIG. 1, the inlet conduit for the foaming agent foam enters the housing above the inner end of the conduit delivering the liquid synthetic resin and, according to this invention, a nozzle 4 is positioned at the inner conduit end along the axis of the elongated chamber. The nozzle defines an annular outlet slot radially extending from this axis and inclined toward the outlet 9 of the chamber.

As can be seen in the drawing, the nozzle 4 is adjacent the outlet 9, i.e., relatively close thereto, so that the liquid synthetic resin and the foam are mixed in a relatively small mixing compartment 5 in the chamber between the nozzle 4 and the outlet 9. Actually, the mixing components are spread in relatively thin layers and mixed in this form in a limited zone of the mixing compartment where the annular layer of the liquid synthetic resin enters from the nozzle slot into the relatively thin layer of foam between the housing and the nozzle. Thus, the annular layer of foam is penetrated at this point by the annular layer of liquid syntheic resin sprayed from the nozzle, assuring an intimate mixture of the two components and the formation of a homogeneous synthetic resin foam.

In the illustrated embodiment, the conduit for delivering the curable liquid synthetic resin includes a pipe 11 extending along the chamber axis, and the nozzle 4 includes a body 12 at the inner end thereof and having a conical part extending into the pipe. The conical body part and the inner pipe end define the annular slot of the nozzle.

The relative dimension of the mixing compartment in relation to the remainder of the apparatus has been illustrated in the preferred size. If larger mixing compartments are desired, the other parts of the apparatus are increased in size in the same ratio.

In the embodiment of the liquid synthetic resin delivering conduit illustrated in FIG. 2, an air supply conduit 15 has an outlet in the conduit 16 of pipe 11' which delivers the liquid synthetic resin to the mixing compartment. A valve (not shown) in air supply conduit 15 is arranged to regulate the air supply to conduit 16 or to shut it off entirely, if desired. The illustrated embodiment also includes another air supply conduit 18 which is similarly regulated by a valve (not shown). Obviously, one or the other of the air supply conduits may be omitted.

The illustrated air supply conduit 18 comprises a plurality of annularly arranged air channels 13 arranged in the wall of pipe 11', each air channel ending in annular slot 14 of the nozzle formed by conical body 12. When the apparatus is not in use and no liquid synthetic resin and foaming agent foam are delivered to the mixing compartment, an air blast through conduit 18 will effectively remove all material from this compartment and thus clean the apparatus, making it instantly ready for the next mixing operation. Thus, there is no danger of any hardened foaming agent foam remaining in the mixing compartment and, immediately upon recommencing operation of the apparatus, the components of the mixture delivered to the compartment will be mixed in their desired ratio to obtain the desired mixture for producing the plastic foam.

The air supply conduit 15 makes it possible to blow air into the mixture produced in the mixing compartment, if desired, to produce a fluffier foam. For instance, such an added air supply makes it possible to use less air or other gas in the foaming agent foam, and to supply added air to the finished mixture by delivering it with the liquid synthetic resin.

If will be useful with the embodiment of FIG. 2 to provide a common actuating mechanism for the valves in the liquid synthetic resin and foaming agent foam delivering conduits so that their deliveries begin and end simultaneously. This actuating mechanism should also be arranged to open the valve means in the air supply conduit or conduits only after the valves in the mixture component delivering conduits have been closed. Thus, the resultant air blast produced after delivery of additional material to the mixing compartment has ceased, will push the mixture through outlet 9 and simultaneously separate any foam remaining in the chamber above the nozzle slot from the mixture of the foam with the liquid synthetic resin in the mixing chamber below the nozzle slot.

While the invention has been described in connection with certain now preferred embodiments, it will be understood that many variations and modifications may occur to those skilled in the art after benefiting from the present teaching, without departing from the spirit and scope of this invention as defined in the appended claims.

I claim:

1. An apparatus for continuously producing a plastic foam from a curable liquid synthetic resin and a foaming agent foam containing a curing accelerator for the synthetic resin, comprising:

(1) a housing defining an elongated chamber having a longitudinal axis, (a) the housing having an outlet at one end thereof in communication with the elongated chamber;

(2) a conduit for delivering the curable liquid synthetic resin to the elongated chamber, the conduit passing through the housing into the chamber and terminating in the chamber in an inner end substantially opposite the outlet;

(3) a nozzle at the inner end of the conduit and positioned along the axis of the elongated chamber, (b) the nozzle defining an annular outlet slot radially extending from said axis and inclined toward the outlet of the chamber, (c) the housing defining a mixing compartment in said chamber between the nozzle and the outlet; and (4) an inlet conduit for delivering the foaming agent foam containing the accelerator, the inlet conduit passing through the housing into the portion of the elongated chamber above said nozzle.

2. The apparatus of claim 1, wherein the conduit for delivering the curable liquid synthetic resin includes a pipe extending along the axis of the chamber, and the nozzle includes a body at the inner end thereof and having a conical part extending into the pipe, the conical body and the inner pipe end defining said annular slot.

3. The apparatus of claim 1, further comprising an air supply conduit having an outlet in said (2) conduit for delivering the curable liquid synthetic resin.

4. The apparatus of claim 1, further comprising an air supply conduit having an outlet in said annular slot.

5. The apparatus of claim 4, wherein said air supply conduit comprises a plurality of annularly arranged air channels each ending in said annular slot.

References Cited

UNITED STATES PATENTS

| | | | |
|---|---|---|---|
| 2,764,565 | 9/1956 | Hoppe | 23—252 X |
| 2,990,380 | 6/1961 | Auerbach | 23—252 |
| 3,043,670 | 7/1962 | Vieli | 23—285 |
| 3,072,462 | 9/1963 | Anderson | 23—252 |
| 3,156,535 | 11/1964 | Humphreys | 23—285 |
| 3,169,833 | 2/1965 | Breer | 23—285 X |
| 3,232,585 | 2/1966 | Garbarino | 259—4 |
| 3,232,709 | 2/1966 | Cole | 23—252 |
| 3,329,631 | 7/1967 | Pilgrim | 23—285 |
| 3,377,139 | 4/1968 | Mac Gregor | 23—252 X |

MORRIS O. WOLK, *Primary Examiner.*

SIDNEY MARANTZ, *Assistant Examiner.*

U.S. Cl. X.R.

23—252; 259—4; 260—2.5